United States Patent
Tashiro et al.

(10) Patent No.: US 6,892,126 B2
(45) Date of Patent: May 10, 2005

(54) CONTROL SYSTEM FOR VEHICLE

(75) Inventors: Tsutomu Tashiro, Nagoya (JP);
Mamoru Mabuchi, Kariya (JP);
Toshiki Matsumoto, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/353,001

(22) Filed: Jan. 29, 2003

(65) Prior Publication Data

US 2003/0144784 A1 Jul. 31, 2003

(30) Foreign Application Priority Data

Jan. 30, 2002 (JP) .......................... 2002-021970

(51) Int. Cl.$^7$ ............................. G06F 7/00; B60K 41/04
(52) U.S. Cl. ............................. 701/54; 701/51; 701/53; 477/107; 477/110
(58) Field of Search ......................... 701/1, 51, 55–56, 701/53, 54, 101, 102, 103, 33, 36, 84, 86; 477/43, 107, 110, 115, 90; 73/117.2, 117.3

(56) References Cited

U.S. PATENT DOCUMENTS

| | | | |
|---|---|---|---|
| 5,050,454 A | * 9/1991 | Yamaguchi et al. | ........ 477/109 |
| 5,351,776 A | 10/1994 | Keller et al. | ................ 180/79.1 |
| 5,490,815 A | * 2/1996 | Kato et al. | .................... 477/181 |
| RE37,703 E | * 5/2002 | Bellinger | ..................... 477/111 |
| 6,470,252 B2 | 10/2002 | Tashiro et al. | ................ 701/51 |
| 2002/0171383 A1 | * 11/2002 | Hisada et al. | ................ 318/432 |

FOREIGN PATENT DOCUMENTS

JP 7-108882 4/1995

* cited by examiner

Primary Examiner—Jacques H. Louis-Jacques
(74) Attorney, Agent, or Firm—Nixon & Vanderhye P.C.

(57) ABSTRACT

A control system for vehicle power train components has an engine ECU, an AT ECU and a manager ECU. The manager ECU outputs command signals such as a target engine torque and a target AT range for the engine ECU and the AT ECU. The manager ECU retrieves data for completing a map for determining availability of the target engine torque from the engine ECU. The manager ECU checks the availability of a computed value of the target engine torque, and if it is necessary, the manager ECU replaces the target engine torque with an available value. The engine ECU executes an engine control process on the basis of the target engine torque of which availability has thus been ensured by the manager ECU. It is therefore possible to operate the vehicle power train components in a more appropriate manner.

18 Claims, 6 Drawing Sheets

| PRESENT OPERATION | PROHIBITED ATR | AVAIRABLE ATR |
|---|---|---|
| 1→2 | N/A | 1, 2, 3, 4 |
| 2→3 | N/A | 1, 2, 3, 4 |
| 3→4 | 1 | 2, 3, 4 |
| 1→3 | 2 | 1, 3, 4 |
| 2→4 | 1 | 2, 3, 4 |

CONTROL SYSTEM FOR VEHICLE

CROSS REFERENCE TO RELATED APPLICATIONS

This application is based on Japanese Patent Application No. 2002-21970 filed on Jan. 30, 2002, the contents of which are incorporated herein by reference.

BACKGROUND OF THE INVENTION

1. Field of the Invention

The present invention relates to a control system for a vehicle component such as a vehicle power train, more specifically, it relates to an integrated control system for vehicle power train components including an engine and a transmission.

2. Description of Related Art

An integrated control system for vehicles is disclosed in JP-A-07-108882 and JP-A-05-85228. In such the integrated control system, a plurality of control units are arranged in upper and lower layers, and the control unit in the upper layer supervises and commands the control unit in the lower layer. For example, a main power train control unit controls a fuel injection control unit, an ignition control unit, an input and output control unit, a transmission control unit and a throttle control unit via a communication line. In such an integrated system, the control unit in the upper layer computes a command signal for the control unit in the lower layer. However, the control unit in the lower layer might not be able to respond to the command signal due to its control characteristics.

For example, consider the case where a main control unit and an engine control unit are connected via a communication line, the main control unit computes a target engine torque, and the engine control unit controls the engine in accordance with the target engine torque. Since the target engine torque is only computed, in particular cases, the engine cannot actually output the target engine torque. For example, in a particular small torque range, the engine torque may be controlled in a step-by-step manner, and there is a range in which the target engine torque is not available. As a result, the vehicle may be driven and operated in an undesirable manner.

SUMMARY OF THE INVENTION

It is an object of the present invention to provide a control system for vehicles that is capable of controlling behavior of the vehicle in a more desirable manner.

It is another object of the present invention to provide a control system for vehicles that is capable of preventing the control unit from outputting a command signal that is actually not available.

It is still another object of the present invention to provide a control system for vehicles that is capable of controlling a vehicle on the basis of a target engine torque which is ensured to be avialable for output from the engine.

In a first aspect of the present invention, a control system for a vehicle comprises a main control unit and an engine control unit. The main control unit determines a command signal for controlling a behavior of the vehicle in a desirable manner, and outputs the command signal. The engine control unit operates an engine component for controlling an output of an engine in accordance with the command signal. The main control unit determines the command signal by using data indicative of a continuous control range and a step-by-step control range of the engine. The continuous control range indicates a range in which the output of the engine is continuously variable. The step-by-step control range indicates a range in which the output of the engine is variable in a step-by-step manner. The main control unit determines the command signal so that the main control unit outputs the command signal that is available for output by the engine.

According to the present invention, it is possible to prevent the main control unit from outputting an unavailable value of the command signal. It is therefor possible to control the vehicle in a more appropriate manner.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
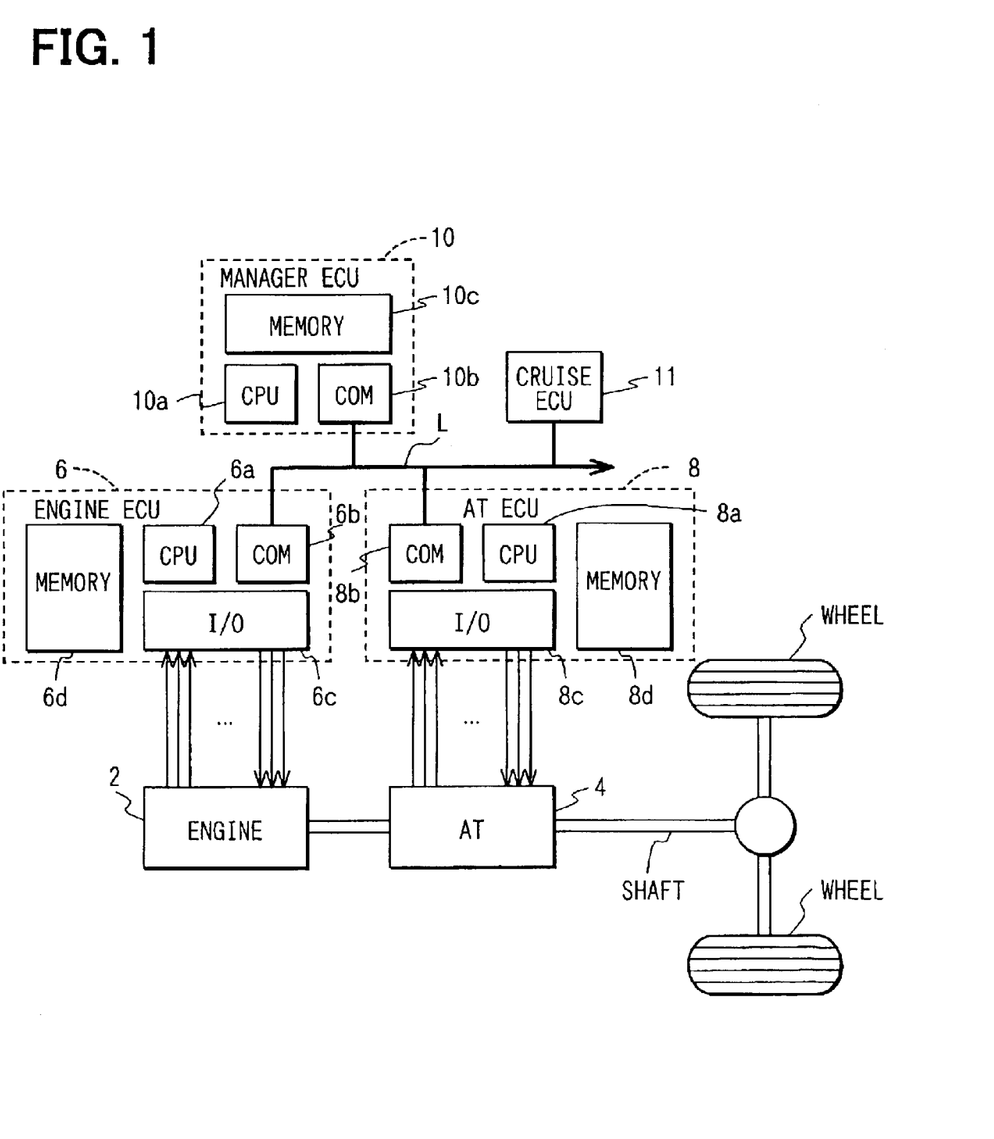
FIG. 1 is a block diagram showing a power train of a vehicle and a control system for the power train according to a first embodiment of the present invention.

Referring to FIG. 1, a first embodiment of a control system for a vehicle power train is illustrated in a schematic manner. The vehicle power train has several components such as an engine 2, an automatic transmission 4, driven wheels and torque transmitting members such as a driven shaft. The engine 2 is a multi-cylinder internal combustion engine, e.g., a gasoline engine. The automatic transmission 4 is a four speed automatic transmission (AT) with a torque converter.

The control system shown in FIG. 1 is a part of a vehicle control system that includes a plurality of electronic control units connected each other via a communication line L. Each electronic control unit (ECU) is a micro controller having well known hardware devices such as a CPU and memory devices.

The power control system has an engine ECU 6, an AT ECU 8 and a manager ECU 10. The engine ECU 6 has a CPU 6a as a computing unit, a communication controller 6b, an I/O unit 6c and a memory 6d. The memory 6d stores data indicative of characteristics of the engine 2. The AT ECU 8 has a CPU 8a as a computing unit, a communication controller 8b, an I/O unit 8c and a memory 8d. The manager ECU 10 works as a main ECU for the control system. The manager ECU 10 has a CPU 10a as a computing unit, a communication controller 10b and a memory 10c. The vehicle control system further includes a cruise control ECU 11 that controls the power train to maintain the vehicle speed constant when the driver turns on a cruise control switch. The cruise control ECU 11 may control the power train so that the vehicle follows the preceding vehicle on the traffic while keeping distance therebetween. The cruise control ECU 11 sends information including status of a cruise control flag that indicates ON or OFF of the cruise control, and a target acceleration/deceleration for executing the cruise control to the manager ECU 10. The engine ECU 6, the AT ECU 8, the manager ECU 10 and the cruise control ECU are connected via the communication line L and exchange information for controlling the power train components.

The engine ECU 6 controls components of the engine 2 such as fuel injectors and spark ignition device in accordance with command signals from the manager ECU 10. The engine ECU 10 is connected with a plurality of sensors and inputs sensor signals. For example, an accelerator pedal sensor for detecting operating degree ACCP of an accelerator pedal, an airflow meter for detecting an amount of intake air, an intake temperature sensor for detecting a temperature of intake air, a throttle valve sensor for detecting an opening degree of a throttle valve, and an oxygen concentration sensor for detecting an oxygen concentration in exhaust gas are connected with the engine ECU 10. In addition, a knock sensor for detecting knocking of the engine, a water temperature sensor for detecting a temperature of cooling water of the engine, a crank angle sensor for detecting a rotation angle of the engine and a rotational speed NE of the engine, and an ignition switch are connected with the engine ECU 10. The engine ECU 10 is also connected with a plurality of actuators. For example, fuel injectors respectively disposed on each cylinder of the engine, an spark igniter for generating ignition voltage, a fuel pump for supplying fuel from a fuel tank to the fuel injectors, a motor for driving the throttle valve of the engine are connected with the engine ECU 10.

The AT ECU 8 controls components of the AT 4 such as shift solenoid and control valves in accordance with command signals from the manager ECU 10. The AT ECU 8 is connected with a rotational speed sensor for detecting a rotational speed of an input shaft from the torque converter to a transmission unit, a vehicle speed sensor for detecting a vehicle speed VW based on a rotational speed of the driven shaft, and an oil temperature sensor for detecting a temperature of operational oil in the AT 4. The AT ECU 8 is further connected with a shift position switch for detecting position of shift lever, a stop lamp switch for detecting an operation of brakes of the vehicle. The AT ECU 8 is also connected with a plurality of solenoid actuators. For example, the solenoid actuator includes a shift solenoid for changing shift ranges of the AT 4, a line pressure control solenoid for controlling pressure of shifting clutches, and a lock-up control solenoid for controlling pressure of a lock-up clutch that connects the input and output shafts of the torque converter.

The manager ECU 10 generates the command signals to operate both the engine 2 and the AT 4 properly. For example, the command signals are obtained in order to achieve a target output torque in a manner that both the engine 2 and the AT 4 are operated in an economical and efficient manner. The input signals of the engine ECU 6 and the AT ECU 8 are transmitted to the other ECU, e.g., the manager ECU 10.

Figure 2:
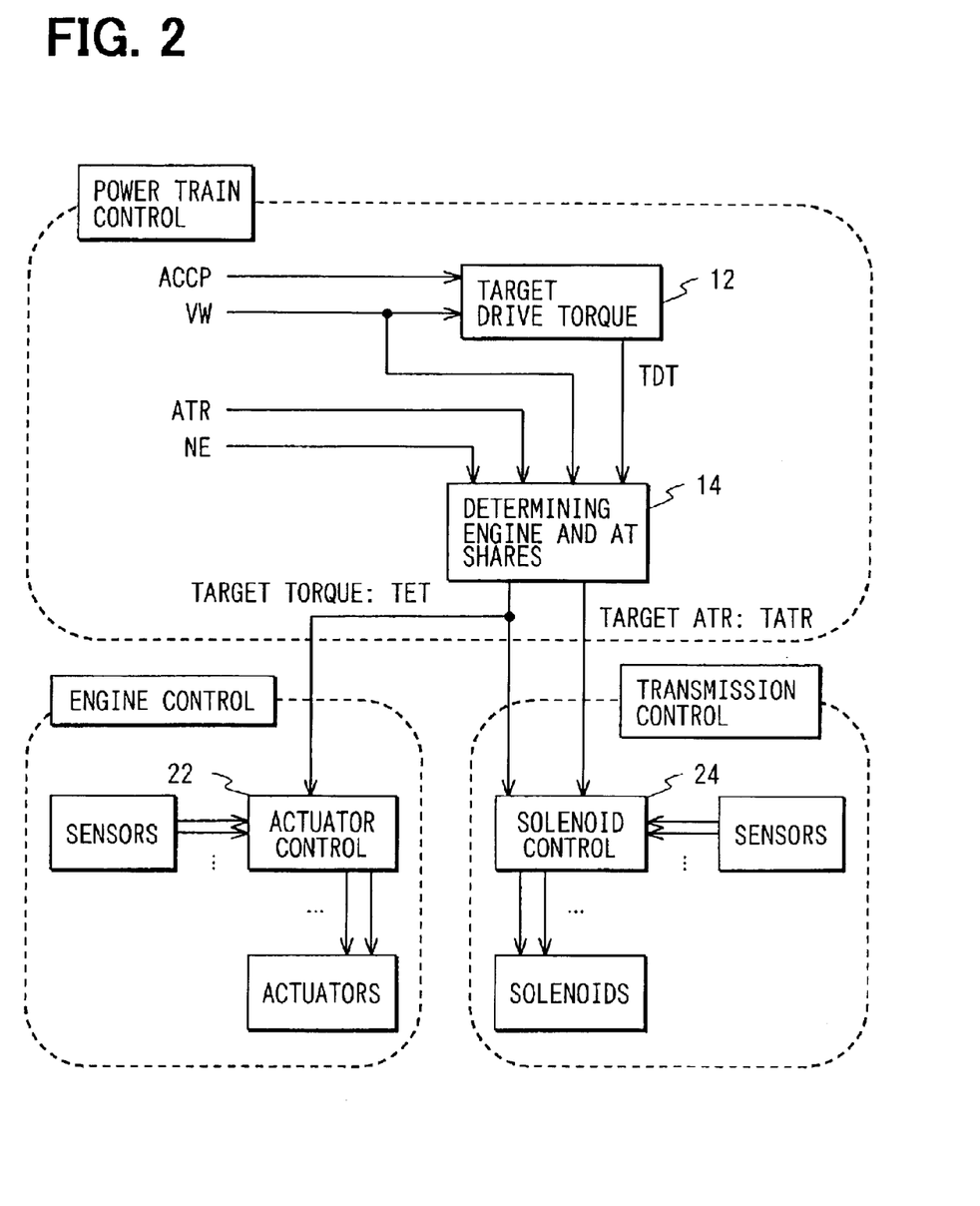
FIG. 2 is a block diagram showing the control system for the power train according to the first embodiment of the present invention.

Referring to FIG. 2, the manager ECU 10 executes a power train control for determining a target torque TET and a target AT range TATR. First, a target drive torque TDT is determined in a target drive torque determining unit 12 on the basis of input sensor signals such as ACCP and VW. The target drive toque TDT defines a behavior of the power train. A share determining unit 14 determines a share of the engine 2 and a share of the AT 4 to achieve the target drive torque TDT. The share determining unit 14 also inputs VW, NE and a present AT range ATR. The share determining unit 14 outputs the target torque TET and the target AT range TATR.

The share determining unit 14 determines TET and TATR on the basis of a predetermined control method and rules. The control method and rules are defined by taking a demand of the driver estimated from the present position of the shift lever, a requirement for preventing an over speed, a fuel economy, emissions, and a stability of combustion into consideration. The control method and rules are designed to determine a preferable engine operating point for achieving TDT, and then to determine TET and TATR based on the preferable engine operating point.

A control method and rules for determining TDT in the target drive torque determining unit 12 is obtained by maps or expressions stored in the memory devices. The control method and rules for determining TET and TATR is also obtained by maps or functional expressions stored in the memory devices. Specific values in the maps or expressions in the control methods and rules are previously stored in the engine ECU 6 and the AT ECU 8, and are obtained from those ECUs 6, 8 to the manager ECU 10 via the communication line L. The manager ECU 10 completes the maps and expressions, and determines TDT, TET and TATR by using the completed maps and expressions. For example, the manager ECU 10 stores common control method and rules defined with several variables. The engine ECU 6 or the AT ECU 8 may store specific values of the variables that are adapted to the engine 2 or the AT 4. Then, the manager ECU 10 adjusts and adapts the control method and rules in accordance with the specific values of the variables transmitted from the engine ECU 6 or the AT ECU 8.

Figure 3:
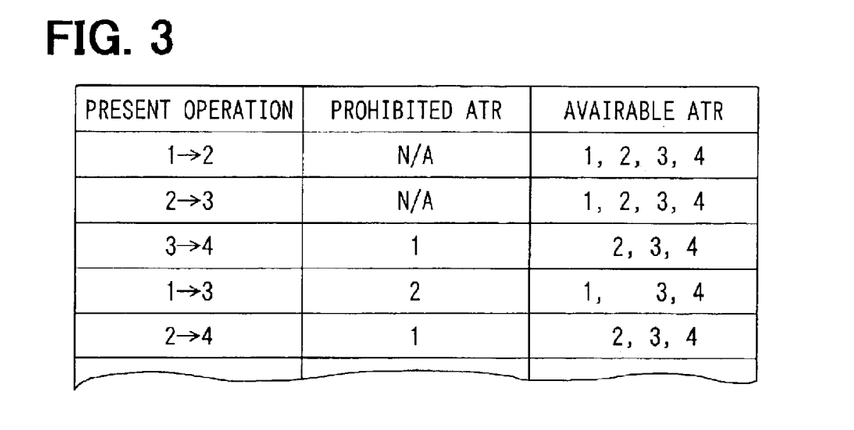
FIG. 3 is a chart showing a map for defining available range of an automatic transmission with respect to present operation of the automatic transmission according to the first embodiment of the present invention.
Figure 4:
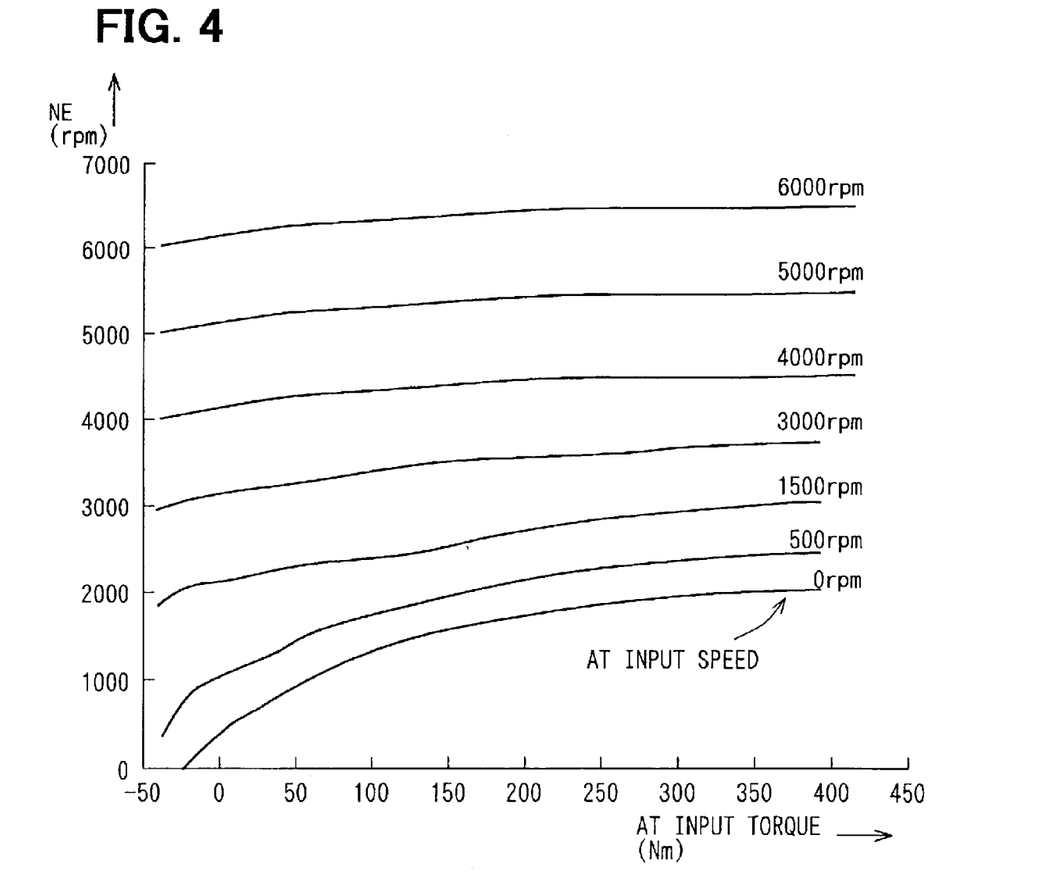
FIG. 4 is a graph showing characteristics of a torque converter according to the first embodiment of the present invention.
Figure 5:
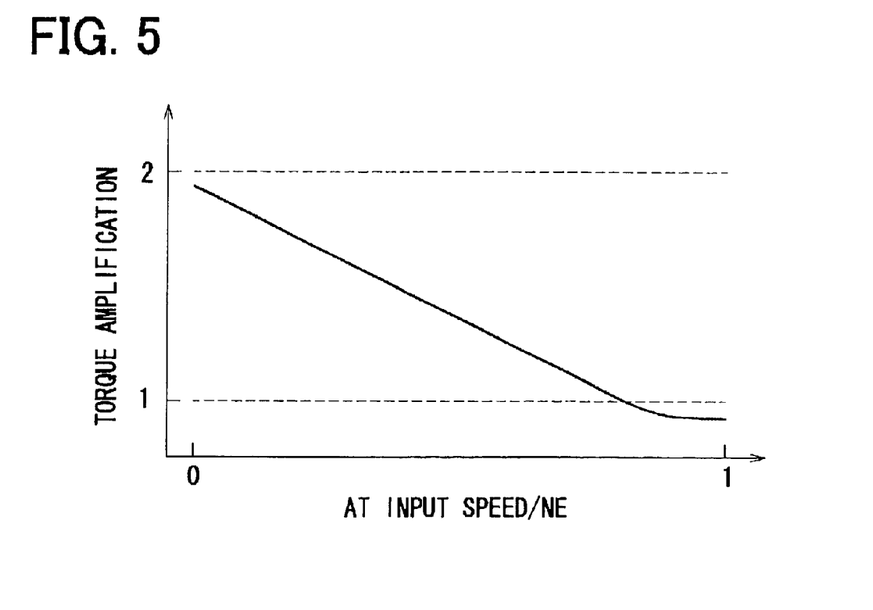
FIG. 5 is a graph showing a torque amplification characteristic of the torque converter according to the first embodiment of the present invention.
Figure 6:
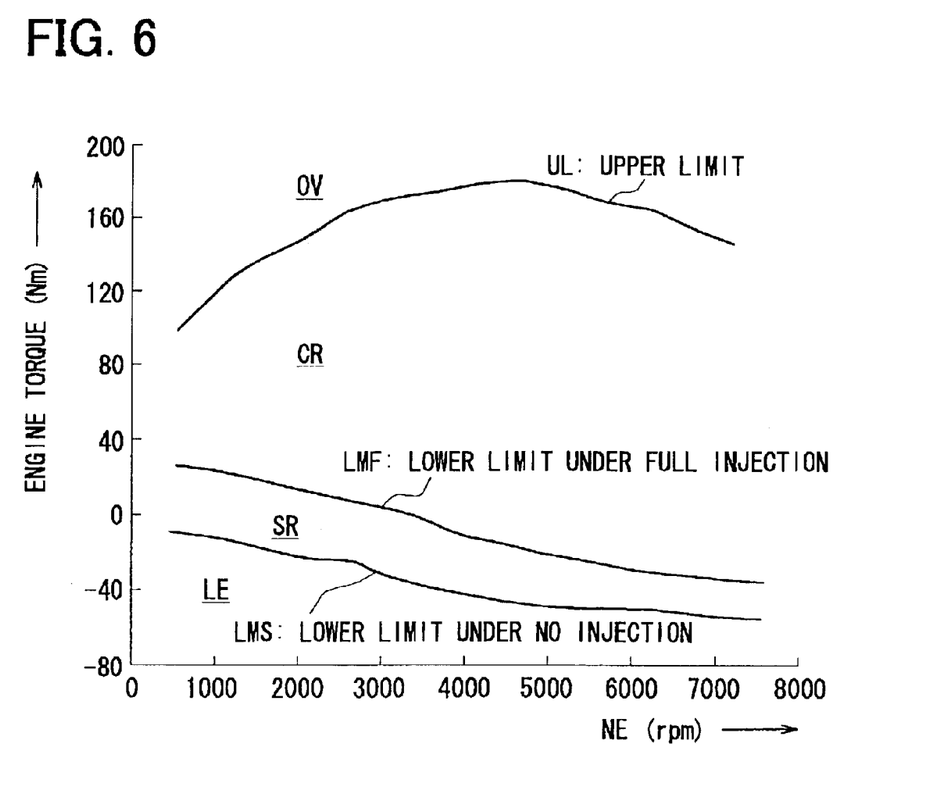
FIG. 6 is a graph showing relationship between an engine speed NE and an engine torque, and showing control ranges of the engine according to the first embodiment of the present invention.

For instance, the manager ECU 10 stores maps as shown in FIGS. 3–6. FIG. 3 shows a map for determining prohibited AT range and available AT range in accordance with the present shifting operation. FIG. 4 shows a map of a torque converter characteristic indicated by the engine speed NE, an AT input speed and an AT input torque. FIG. 5 shows a map of a torque amplification of the torque converter indicated by a ratio of the AT input speed to the engine speed NE. FIG. 6 shows a map of control ranges indicated by the engine speed NE and the engine torque.

The characteristic illustrated in FIG. 6 corresponds to information indicative of the control ranges of engine output. In FIG. 6, a line indicated by UL shows a maximum engine torque available in accordance with the engine speed NE. A line indicated by LMF shows a lower limit of the engine torque when the engine is operated under a condition in which all cylinders are supplied with a minimum amount of fuel via the fuel injectors. Therefore, on the line LMF, the amount of injected fuel is restricted as small as possible to keep the engine running. A line indicated by LMS shows a lower limit of the engine torque when the engine is operated with no fuel injection, e.g., fuel cut operation. On the line LMS, no fuel is injected, therefore the engine torque is always negative. A control range CR shows a range in which the engine output torque is continuously variable from the line LMF to the line UL in accordance with an amount of fuel. A control range SR shows a range in which the engine output torque is not available, since the engine 2 has no operable mechanism and control factor in this range. That is, the engine torque is merely variable in a step-by-step manner by operating the engine under a minimum fuel injection or no fuel injection. A control range OV shows a range in which a demanded engine torque is not available since it exceeds the upper limit of the engine torque. A control range LE shows a range in which demanded engine torque is not available since it is too low. If it is required to set one or more additional output torque line above or below the line LMS, the engine 2 may has one or more additional mechanisms such as a variable cylinder mechanism, and a variable valve timing mechanism. In addition, accessory devices may be operated for setting additional output torque lines above or below the line LMS. For example, a refrigeration cycle compressor with controllable clutch, a variable displacement compressor or oil pump, or an AC generator can be used to define more output torque line in a step-by-step manner.

Return to FIG. 2, the manager ECU 10 transmits TET as the command signal to the engine ECU 6, and transmits TATR as the command signal to the AT ECU 8.

The engine ECU 6 executes an engine control processing. In the processing, the engine ECU 6 inputs TET as an information indicative of a target operation of the engine from the manager ECU 10. An actuator control unit 22 calculates and determines drive signals for the actuators in accordance with the sensor signals and TET so that the engine 2 generates the target torque TET under a predetermined target air-fuel ratio. For example, the actuator control unit 22 determines a target throttle opening degree, an amount of fuel to be injected, and an ignition timing, and outputs drive signals to the fuel injectors, the igniter, the fuel pump, and the throttle valve driving motor.

The AT ECU 8 executes an AT control processing. In the processing, the AT ECU 8 inputs TATR as information indicative of a target operation of the AT 4 and TET from the manager ECU 10. A solenoid control unit 24 calculates and determines drive signals for the solenoids in accordance with the sensor signals, TET and TATR so that the AT 4 is shifted to an appropriate range. For example, the solenoid control unit 24 outputs drive signal to the solenoids for shifting the ranges and signal to the solenoid for controlling the line pressure. The signal for the line pressure control solenoid is determined in accordance with TET. The solenoid control unit 24 also determines a target lock up clutch pressure and outputs signal corresponding to the target lock up clutch pressure to the lock up solenoid. The target lock up clutch pressure is determined so that a predetermined lock up characteristic is obtained in accordance with operating condition of the engine 2 and the AT 4. The predetermined lock up characteristic may obtain an open mode, a slip mode, and a connected mode of the lock up clutch, and is determined by taking a fuel economy, a shifting feeling into consideration.

As described above, the manager ECU 10 determines the command signal such as TET and TATR, and the engine ECU 6 and the AT ECU 8 executes respective controls on the basis of the command signal from the manager ECU 10 and its own control characteristics such as control method and rules. Especially, the manager ECU 10 determines the command signal in accordance with the map that indicates availability of engine torque. Therefore, it is possible to prevent the manager ECU 10 from outputting an unavailable command signal, such as an unavailable value of the target engine torque TET.

Figure 7:
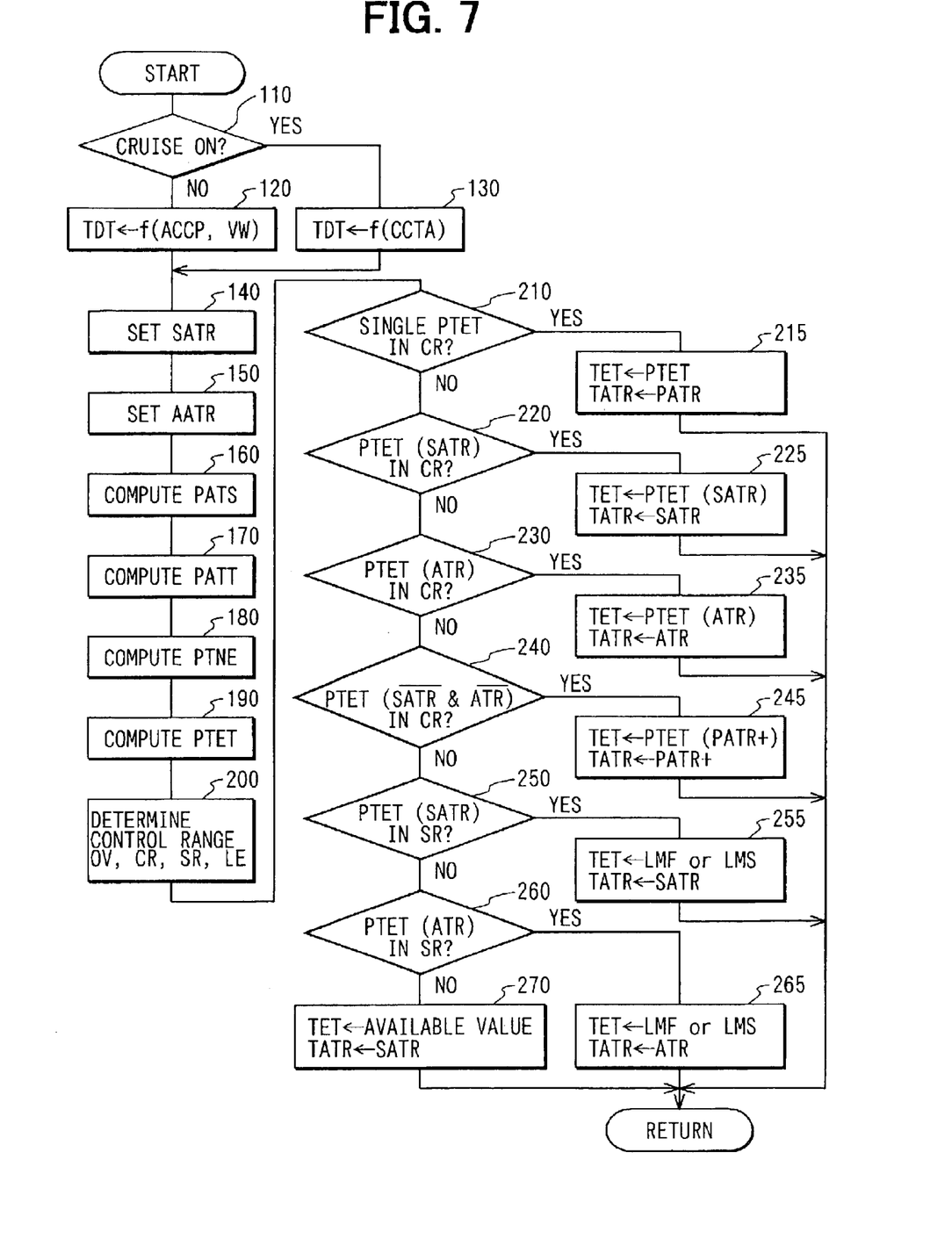
FIG. 7 is a flowchart showing a processing in a manager ECU according to the first embodiment of the present invention.

FIG. 7 shows a processing of the power train control executed in the manager ECU 10. The manager ECU 10 computes potential target values on the basis of the detected engine condition and the driver's demand at steps 110–190. Then, the manager ECU 10 determines the target values on the basis of the computed potential target values and the information indicative of the availability thereof at steps 200–270. The manager ECU 10 determines whether or not the computed potential target values are available. Then, the manager ECU 10 selects and sets the potential target values or available approximate values as the target values.

In step 110, it is determined that whether or not the cruise control is requested. For example, it is detected that whether the cruise control switch is turned on or off. If the cruise control is not demanded, a target drive torque TDT is computed on the basis of a predetermined function f, ACCP and VW in step 120. A revolution speed on an output shaft of the AT 4 may be used instead of the vehicle speed VW. The value of TDT indicates a target value of a drive torque on the drive shaft. TDT is computed to satisfy the driver's demand of acceleration and deceleration. TDT is computed in accordance with a character of the vehicle such as a family use car, a sporty car or a luxury car.

If the cruise control is demanded, TDT is computed on the basis of a predetermined function f, and a cruise control target acceleration/deceleration CCTA in step 130. The cruise control ECU 11 obtains CCTA via the communication line L and the communication devices. CCTA indicates a value of acceleration or deceleration that is possible to maintain the vehicle speed on a target speed. For instance, TDT can be obtained by adding a feed forward component and a feedback component. The feed forward component indicates a drive torque that is possible to realize CCTA against a standard driving resistance when the vehicle is driven on a straight and flat road with standard weight and no wind. The feed forward component may be computed by looking up a map determined by VW and the target acceleration/deceleration. The feedback component indicates a drive torque for decreasing a difference between the target acceleration/deceleration and an actual acceleration/deceleration. The feedback component may be computed on the basis of the PID control method.

Figure 8:
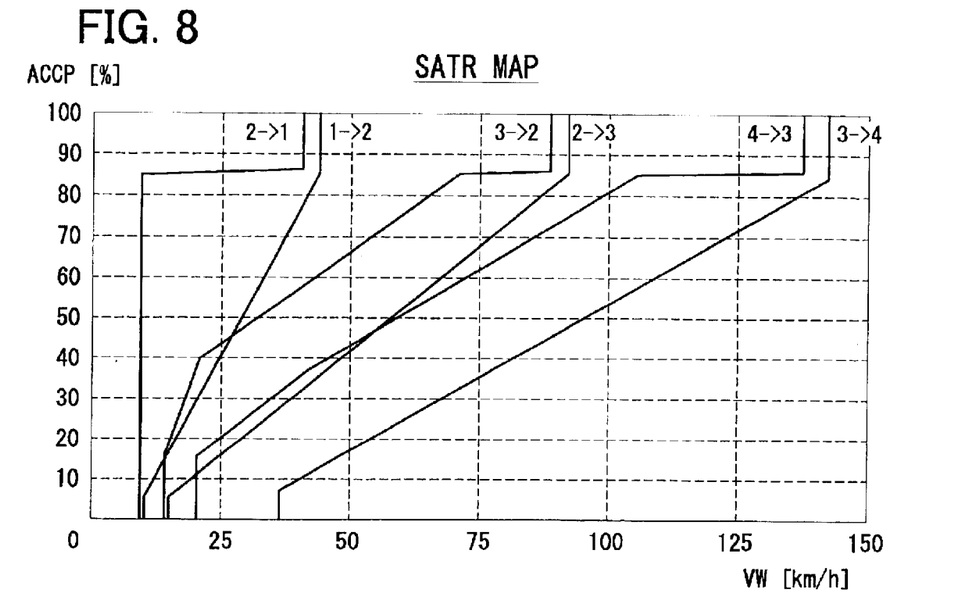
FIG. 8 is a graph showing a map for determining a value SATR according to the first embodiment of the present invention.

In step 140, a suggestive AT range SATR is determined on the basis of a map as shown in FIG. 8. The suggestive AT range SATR is obtained as an optimal AT range in accordance with the present operating condition of the vehicle indicated by the present values of ACCP and VW. In step 150, the manager ECU 10 looks up the map shown in FIG. 3 for determining all of available AT ranges AATR except for SATR. SATR is always one of AATR shown in FIG. 3. AATR is determined in accordance with a present operation of the AT 4. Hereinafter, SATR and AATR are also called as a potential AT range PATR.

In step 160, a potential AT input speed PATS is computed in connection with PATR. For instance, PATS may be obtained by applying a present value of the AT output speed and a transmission ratio indicated by PATR. If a plurality of PATRs are obtained in the step 140 and 150, a plurality of PATSs are computed in connection with each of PATRs respectively. In the following descriptions, a potential AT input torque PATT, a potential target engine speed PTNE, and a potential target engine torque PTET are computed in connection with respective one of PATR. In addition, a determination of an availability of the target engine torque is also performed in respective one of PATR.

In step 170, the potential AT input torque PATT is computed by dividing TDT by the transmission ratio indicated by PATR. In step 180, the potential target engine speed PTNE is computed on the basis of the transfer characteristic of the torque converter as shown in FIG. 4, PATS and PATT.

In step 190, the potential target engine torque PTET is computed on the basis of the map shown in FIG. 5, PATS, PTNE, and PATT. The map shown in FIG. FIG. 5 obtains a torque amplification of the torque converter in accordance with PATS and PTNE. Then, PTET is calculated based on the torque amplification and PATT.

In step 200, the control range is determined by using the map shown in FIG. 6, PTNE and PTET. The control range is determined by looking up the map based on a location of PTET when the engine speed is assumed PTNE. This determination is carried out for all of the computed PTETs. The determining process of the control range is a determining process for the availability of the potential target engine torque. The manager ECU 10 determines the control range CR, SR or others for each PTET.

In step 210, it is determined that whether or not only one PTET is in the control range CR. If the determination is YES, PTET is set as the target engine torque TET, and PATR is set as the target AT range TATR in step 215. If the determination is NO, the routine proceeds to step 220. In this case, no PTET is in the control range CR or plural PTETs are in the control range CR.

In step 220, it is determined that whether or not PTET (SATR) is in the control range CR. PTET(SATR) denotes the potential target engine torque corresponding to the suggestive AT range. If the determination is YES, PTET(SATR) is set as TET, and SATR is set as TATR in step 225. If the determination is NO, the routine proceeds to step 230.

In step 230, it is determined that whether or not PTET (ATR) is in the control range CR. PTET(ATR) denotes the potential target engine torque corresponding to the present AT range. If the determination is YES, PTET(ATR) is set as TET, and ATR is set as TATR in step 235. If the determination is NO, the routine proceeds to step 240.

In step 240, it is determined that whether or not PTET (Not(SATR) and Not(ATR)) is in the control range CR. PTET(Not(SATR) and Not(ATR))) denotes the potential target engine torque corresponding to an AT range that is not SATR and is not ATR. In FIG. 7, "Not" is shown by a bar symbol. If the determination is YES, PTET(PATR+) is set as TET, and PATR+ is set as TATR in step 245. PATR+ denotes one of the potential AT ranges that is the closest one to the present AT range and is a high-speed side range than the present AT range. Therefore, PTET(PATR+) denotes the potential target engine torque corresponding to PATR+. In the case of step 245, the TATR will be one of AATR set in step 150. For example, if both SATR and ATR were the 3rd range, and PATRs and AATRs were the 1st, 2nd and 4th ranges, the 4th range is selected as PATR+. Such a high-select rule is advantageous for preventing shock and vibration on the vehicle when changing the range of the AT 4. If the determination is NO, the routine proceeds to step 250.

In step 250, it is determined that whether or not PTET (SATR) is in the control range SR. If the determination is YES, SATR is set as TATR in step 255. In addition, TET takes a value on the line LMF or LMS. In this step, one of the lines LMF and LMS that is closer to PTET(SATR) is selected, and TET is determined under assuming the engine speed is PTNE. If PTET(SATR) is on the middle between the lines LMF and LMS, the line LMS is selected. Such a low-select rule is advantageous in fuel economy. If the determination is NO, the routine proceeds to step 260.

In step 260, it is determined that whether or not PTET (ATR) is in the control range SR. If the determination is YES, ATR is set as TATR in step 265. In addition, TET takes a value on the line LMF or LMS. The value of TET is obtained similarly to the process in step 255. If the determination is NO, the routine proceeds to step 270.

In step 270, SATR is set as TATR. In addition, an available value that is available and is the closest one to PTET(SATR) is set as TET. In the case of above, no PTET exists in both the control ranges CR and SR. Therefore, TET will be a value on the line UL or LMS.

Then, the manager ECU 10 outputs TET and TATR to the engine ECU 6 and the AT ECU 8. In this embodiment, both TET and TATR are transmitted as command signals indicative of control guide or control target. The engine ECU 6 and the AT ECU 8 execute their own control processing in accordance with at least one of TET and TATR.

According to the embodiment described above, it is possible to determine optimal values of the command signals in accordance with the characteristics of the control objects. The manager ECU 10 can determine optimal values of the target engine torque TET and the target AT range TATR in accordance with the characteristics of the engine 2 and the AT, since the data for characterizing the maps used in the manager ECU 10 is transmitted from the engine ECU 6 and the AT ECU 8 via the communication line L.

In addition, since an availability of the command signals is evaluated, and ensured the availability of the command signals, therefore, it is possible to prevent outputting an impossible command signals. The manager ECU 10 evaluates that whether or not the computed command signals are available, and replace it with available values if the computed command signal is not available, therefore, it is possible to prevent outputting an impossible command signals from the manager ECU 10. As a result, it is possible to control the drive torque TDT in a manner that the vehicle is controlled in a desirable behavior.

In addition, in case that the availability of the command signal is defined with a continuous control range and a step-by-step control range, the command signal is obtained based on the value in the continuous control range taking priority over the value in the step-by-step control range. For instance, in determining the target engine torque TET, the manager ECU 10 selects the potential target engine torque PTET in the continuous control range CR taking priority over the potential target engine torque PTET in the step-by-step control range SR. Therefore, it is possible to operate the engine 2 under the continuous control range and in a stable manner, and to reduce the fuel-cut operation in which the engine output torque may be changed largely.

In addition, in case that the availability of the command signal is defined with a suggestive or desirable value and a present value, the command signal is obtained based on the suggestive or desirable value taking priority over the present value. For instance, in determining the target AT range TATR, the manager ECU 10 selects the suggestive AT range SATR taking priority over the present AT range ATR. Therefore, it is possible to obtain the target AT range TATR that is optimal for realizing the target drive torque TDT. If the suggestive AY range SATR is not available, it is possible to obtain the target AT range TATR that is capable of preventing a shock and vibrations on the vehicle. As a result, it is possible to drive the vehicle in a stable manner.

In addition, the manager ECU 10 retrieves the data for completing the maps and the like from the engine ECU 6 or the AT ECU 8 which are designed for the specific engine 2 or the specific AT 4. Therefore, it is possible to design the manager ECU 10 at less cost and less time. Moreover, the manager ECU 10 may be used for several types of vehicles.

The embodiment described above may be modified with the following means.

A brake control ECU for controlling a vehicle brake system may be connected with the manager ECU 10 via the communication line L. The manager ECU 10 may compute a command signal for the brake control ECU to control the vehicle's motion in an appropriate manner. Moreover, an information system such as a navigation system for displaying a present location of the vehicle and a map may be connected with the manager ECU 10 via the communication line L. In this case, the manager ECU 10 may retrieve information indicative of environmental conditions such as an inclination angle of the road and an altitude, and compute the command signals so that the drive torque or the brake torque is controlled in an appropriate manner.

The engine 2 may be a variable cylinder engine that is capable of varying number of working cylinders. For example, in case of having n cylinders, the variable cylinder engine can cut fuel supply to n-m cylinders, where n is equal to or greater than two (n≧2), and m is smaller than n and is equal to or greater than one (1≦m<n). If the engine has four cylinders, the fuel supply may be suspended for one cylinder, two cylinders, or three cylinders in addition to the fuel cut for four cylinders. Number of fuel cut cylinders may be varied in accordance with the command signal or detected operating condition of the engine. In such the cases, the map shown in FIG. 6 may be modified for defining additional lines between the lines LMF and LMS corresponding to the number of working cylinders. Then, the manager ECU 10 selects the line for determining the target engine torque TET from the lines.

Figure 9:
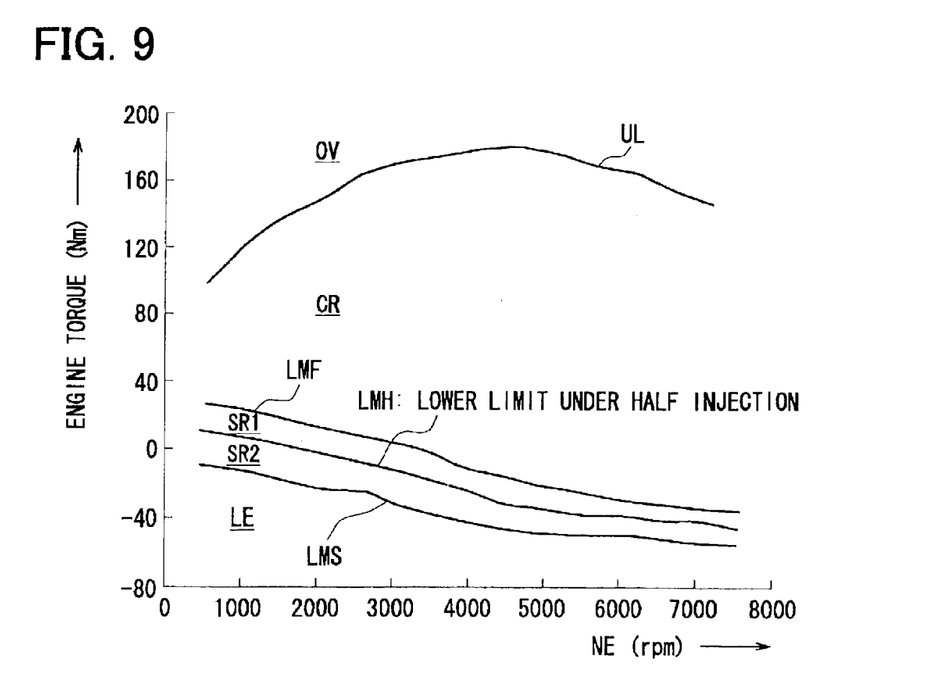
FIG. 9 is a graph showing relationship between an engine speed NE and an engine torque, and showing control ranges of the engine according to a second embodiment of the present invention.

For example, m may be a half of all cylinders, such as two in case of the four-cylinder engine. The engine can be operated under a full injection for four cylinders, a partial injection for two cylinders and no injection. In this case, a map shown in FIG. 9 should be used instead of the map shown in FIG. 6. The map of FIG. 9 further has a line LMH that indicates a lower limit torque under a fuel injection for a half of the cylinders. Therefore, the map of FIG. 9 defines two step-by-step control ranges SR1 and SR2. In steps 255 and 265, the manager ECU 10 selects one line from the lines LMF, LMH and LMS in accordance with the rules described above. As a result, it is possible to control the engine precisely.

If a plurality of the potential target engine torques PTET are exist in the step-by-step control range SR, or SR1 and SR2, the manager ECU 10 may selects one that is the closest to an available engine torque and determines the target engine torque that is available and is the closest to the selected one of the potential target engine torques. This determination process may be added between steps 260 and 270.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A control system for a vehicle, said control system comprising:

a main control unit that determines a command signal for controlling a behavior of the vehicle in a desirable manner, and outputs the command signal; and an engine control unit that operates an engine component for controlling an output of an engine in accordance with the command signal, wherein the main control unit determines the command signal by using data indicative of (a) a continuous control range in which the output of the engine is continuously variable and (b) a step-by-step control range in which the output of the engine is variable in a step-by-step manner so that the main control unit outputs the command signal that corresponds to an available engine output.

2. A control system for a vehicle as in claim 1, wherein the main control unit retrieves the data indicative of the continuous control range and the step-by-step control range from the engine control unit.

3. A control system for a vehicle, comprising:

a main control unit that determines a command signal for controlling a behavior of the vehicle in a desirable manner, and outputs the command signal; and an engine control unit that operates an engine component for controlling an output of an engine in accordance with the command signal, wherein the main control unit determines the command signal by using data indicative of (a) a continuous control range in which the output of the engine is continuously variable and (b) a step-by-step control range in which the output of the engine is variable in a step-by-step manner so that a main control unit outputs the command signal that corresponds to an available engine output; and wherein:

the command signal is a target engine torque, the continuous control range is defined with an upper limit of an output torque of the engine and a lower limit of the output torque of the engine with fuel injection supplied to all cylinders, and the step-by-step control range is defined with the lower limit of the output torque of the engine under a fuel injection supplied to all cylinders and a lower limit of the output torque of the engine with no fuel injection supplied to all cylinders.

4. A control system for a vehicle as in claim 3, wherein the engine has n cylinders, and the step-by-step control range is further defined with a lower limit of the output torque of the engine under a fuel injection for m cylinders, where n≧2, and 1≦m<n.

5. A control system for a vehicle as in claim 3, wherein the main control unit includes:

computing means for computing a potential value for the target engine torque;

first determining means for determining the target engine torque on the basis of the potential value which is in the continuous control range when the potential value is in the continuous control range; and second determining means for determining the target engine torque on the basis of the potential value which is in the step-by-step control range when the potential value is not in the continuous control range but the potential value is in the step-by-step control range.

6. A control system for a vehicle as in claim 5, wherein the second determining means determines the target engine torque in a value that is available by the engine and is the closest to the potential engine torque in the step-by-step control range.

7. A control system for a vehicle as in claim 5, further comprising a transmission control unit that controls a transmission range of a transmission coupled with the engine, wherein the main control unit determines a target transmission range as the command signal and outputs the target transmission range to the transmission control unit.

8. A control system for a vehicle as in claim 7, wherein the computing means further compute a potential value for the target transmission range, and the potential value for the target engine torque is computed in connection with the potential value for the target transmission range, the first determining means determines the target transmission range based on the potential value for the target transmission range that is in connection with the potential value for the target engine torque which is used for determining the target engine torque, and the second determining means determines the target transmission range based on the potential value for the target transmission range that is in connection with the potential value for the target engine torque which is used for determining the target engine torque.

9. A control system for a vehicle as in claim 5, further comprising third determining means for determining the target engine torque when the potential value for the target engine torque is not in both the continuous control range and the step-by-step control range.

10. A method for operating a control system for a vehicle, said method comprising:

determining and outputting a command signal for controlling a behavior of the vehicle in a desirable manner;

operating an engine component so as to control an engine output in accordance with the command signal;

wherein determining the command signal uses data indicative of (a) a continuous control range in which the output of the engine is continuously variable and (b) a step-by-step control range in which the output of the engine is variable in a step-by-step manner so that the output command signal corresponds to an available engine output.

11. A method as in claim 10 wherein:

the command signal is a target engine torque;

the continuous control range is defined with an upper limit of an output torque of the engine and a lower limit of the output torque of the engine with fuel injection supplied to all cylinders, and the step-by-step control range is defined with the lower limit of the output torque of the engine with fuel injection supplied to all cylinders and a lower limit of the output torque of the engine with no fuel injection supplied to all cylinders.

12. A method as in claim 11 wherein the engine has n cylinders, and the step-by-step control range is further defined with a lower limit of the output torque of the engine with fuel injection for m cylinders, where $n \geq 2$, and $1 \leq m < n$.

13. A method as in claim 11 wherein said determining comprises:

computing a potential value for the target engine torque;

determining the target engine torque on the basis of the potential value which is in the continuous control range when the potential value is in the continuous control range; and determining the target engine torque on the basis of the potential value which is in the step-by-step control range when the potential value is not in the continuous control range but the potential value is in the step-by-step control range.

14. A method as in claim 13 wherein the target engine torque is determined as a value that is available from the engine and is the closest to the potential engine torque in the step-by-step control range.

15. A method as in claim 13, further comprising controlling transmission range of a transmission coupled with the engine, wherein a target transmission range is determined as the command signal and the target transmission range is output to a transmission control unit.

16. A method as in claim 15 wherein:

a potential value for the target transmission range is also computed and the potential value for the target engine torque is computed in connection with the potential value for the target transmission range, the target transmission range is determined based on the potential value for the target transmission range that is in connection with the potential value for the target engine torque which is used for determining the target engine torque, and the target transmission range is determined based on the potential value for the target transmission range that is in connection with the potential value for the target engine torque which is used for determining the target engine torque.

17. A method as in claim 13, further comprising determining the target engine torque when the potential value for the target engine torque is not in both the continuous control range and the step-by-step control range.

18. A method as in claim 10 wherein data indicative of the continuous control range and the step-by-step control range is retrieved from an engine control unit.

* * * * *